US011878891B2

(12) United States Patent
Kishi et al.

(10) Patent No.: US 11,878,891 B2
(45) Date of Patent: Jan. 23, 2024

(54) CYLINDER MEMBER AND IMAGE FORMING APPARATUS

(71) Applicant: FUJIFILM BUSINESS INNOVATION CORP., Tokyo (JP)

(72) Inventors: Kazuki Kishi, Kanagawa (JP); Tomoaki Yoshioka, Kanagawa (JP); Kazuyoshi Hagiwara, Kanagawa (JP); Yoko Miyamoto, Kanagawa (JP); Toshiaki Baba, Kanagawa (JP); Tomohiro Wada, Kanagawa (JP); Yosuke Tsutsumi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 220 days.

(21) Appl. No.: 17/547,475

(22) Filed: Dec. 10, 2021

(65) Prior Publication Data

US 2023/0065291 A1 Mar. 2, 2023

(30) Foreign Application Priority Data

Aug. 25, 2021 (JP) ................................ 2021-137609

(51) Int. Cl.
*B65H 5/02* (2006.01)
*B65H 5/08* (2006.01)
(Continued)

(52) U.S. Cl.
CPC ............ *B65H 5/025* (2013.01); *B65H 5/085* (2013.01); *G03G 15/0131* (2013.01);
(Continued)

(58) Field of Classification Search
CPC .......... G03G 15/0131; G03G 15/1685; G03G 15/2028; G03G 15/65; G03G 15/6529;
(Continued)

(56) References Cited

U.S. PATENT DOCUMENTS 6,151,477 A * 11/2000 Takeuchi .......... G03G 15/1685 399/303
2010/0215412 A1* 8/2010 Chiba ............... G03G 15/6558 399/310
2010/0260512 A1* 10/2010 Imamura ........... G03G 15/0131 399/66

FOREIGN PATENT DOCUMENTS

JP S58-5769 A 1/1983

* cited by examiner

*Primary Examiner* — Joseph S Wong
(74) *Attorney, Agent, or Firm* — Oliff PLC

(57) ABSTRACT

A cylinder member includes: a cylinder body having a cross section and including a dent portion; a sheet member wrapped around the cylinder body and including a metal layer contacting the cylinder body and an outer layer; a first attachment member on a sheet member first end portion and removably attached to the dent portion; a second attachment member on a metal layer end portion protruding from the outer layer in the circumferential direction at a sheet member second end portion, the second attachment member being removably attached to the dent portion; a tension-applying mechanism pulling the second attachment member in a dent portion depth direction to apply tension to the metal layer; a projection on one of the second attachment member and metal layer end portion; and a fitting portion on other one of the second attachment member and the metal layer end portion and fitted to the projection.

20 Claims, 13 Drawing Sheets

(51) Int. Cl.
*G03G 15/00* (2006.01)
*G03G 15/01* (2006.01)
*G03G 21/16* (2006.01)
*G03G 15/20* (2006.01)

(52) U.S. Cl.
CPC ......... *G03G 15/2028* (2013.01); *G03G 15/65* (2013.01); *G03G 15/657* (2013.01); *G03G 15/6529* (2013.01); *G03G 15/6558* (2013.01); *G03G 21/168* (2013.01); *G03G 21/1685* (2013.01); *G03G 2215/00409* (2013.01); *G03G 2215/00413* (2013.01); *G03G 2215/00687* (2013.01)

(58) Field of Classification Search
CPC ........... G03G 15/6555; G03G 15/6558; G03G 15/657; G03G 21/168; G03G 21/1685; G03G 2215/00409; G03G 2215/00413; G03G 2215/00687; B65H 5/025; B65H 5/085
See application file for complete search history.

CYLINDER MEMBER AND IMAGE FORMING APPARATUS

CROSS-REFERENCE TO RELATED APPLICATIONS

This application is based on and claims priority under 35 USC 119 from Japanese Patent Application No. 2021-137609 filed Aug. 25, 2021.

BACKGROUND

(i) Technical Field

The present disclosure relates to a cylinder member and an image forming apparatus.

(ii) Related Art

A known transfer device that transfers an image on an image carrier to a transfer material includes a transport unit that moves the transfer material along a circulation path and a gripper piece that is attached to the transport unit, that is supported by a rotating shaft, and that rotates relative to a base member to hold a leading edge portion of the transfer material (see, for example, Japanese Unexamined Patent Application Publication No. 58-005769).

SUMMARY

Aspects of non-limiting embodiments of the present disclosure relate to an improvement of adhesion between a sheet member and a cylinder body compared to when an end portion of a metal layer of the sheet member is freely movable in a circumferential direction of the cylinder body.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a cylinder member including: a cylinder body having a substantially circular cross section and including a dent portion that extends in an axial direction; a sheet member wrapped around the cylinder body and including a metal layer that is in contact with the cylinder body and an outer layer provided on the metal layer; a first attachment member provided on a first end portion of the sheet member and removably attached to the dent portion at a first side of the dent portion in a circumferential direction; a second attachment member provided on an end portion of the metal layer that protrudes from the outer layer in the circumferential direction at a second end portion of the sheet member, the second attachment member being removably attached to the dent portion at a second side of the dent portion in the circumferential direction; a tension-applying mechanism that pulls the second attachment member in a depth direction of the dent portion to apply tension to the metal layer; a projection provided on one of the second attachment member and the end portion of the metal layer; and a fitting portion provided on other one of the second attachment member and the end portion of the metal layer and fitted to the projection.

BRIEF DESCRIPTION OF THE DRAWINGS

An exemplary embodiment of the present disclosure will be described in detail based on the following figures, wherein.

DETAILED DESCRIPTION

An exemplary embodiment of the present disclosure will now be described in detail with reference to the drawings. For convenience of description, the direction of arrow H in FIG. 1 is defined as a vertical direction of the image forming apparatus 10, the direction of arrow W as a width direction of the image forming apparatus 10, and the direction of arrow D as a front-back direction of the image forming apparatus 10.

Figure 1:
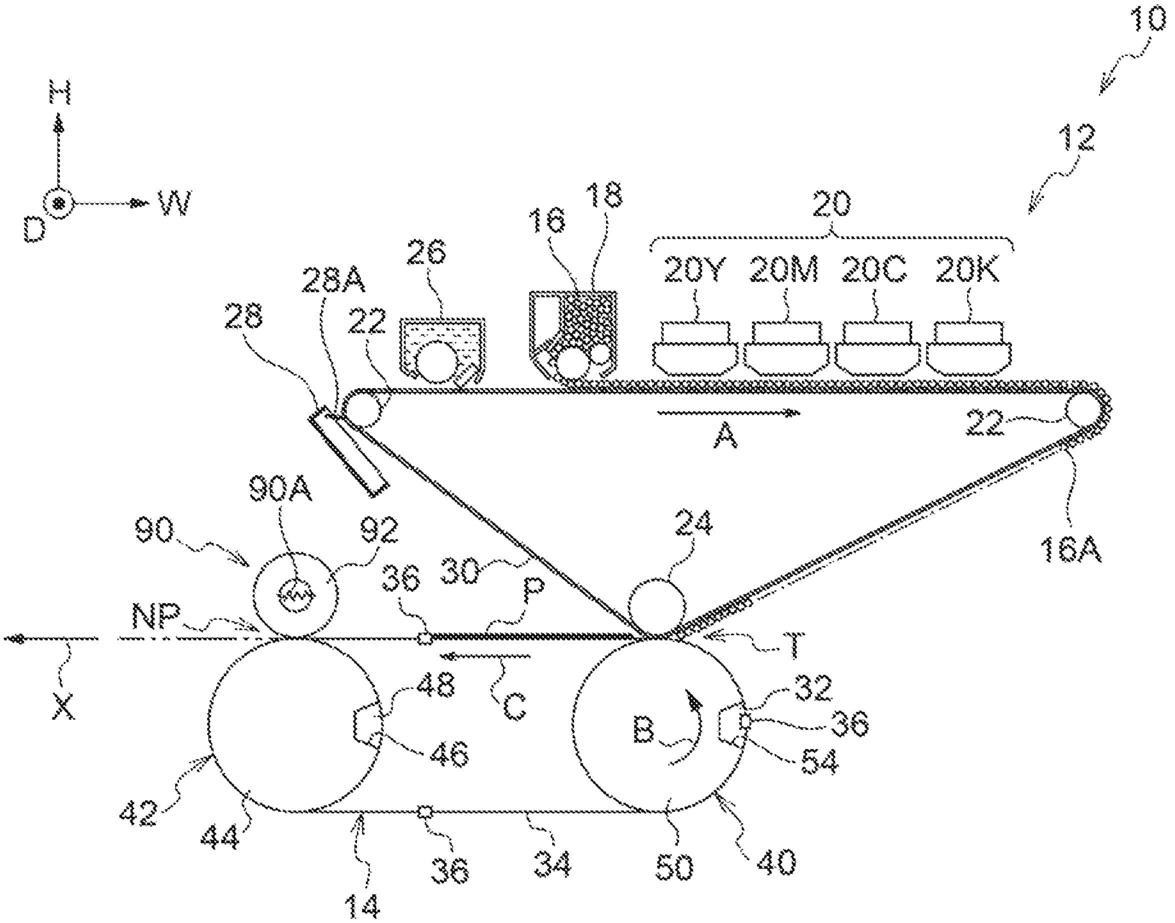
FIG. 1 is a schematic diagram illustrating the structure of an image forming apparatus according to an exemplary embodiment.

As illustrated in FIG. 1, the image forming apparatus 10 is, for example, an inkjet image forming apparatus that forms an ink image, which is an example of an image, on a recording medium P. The image forming apparatus 10 includes an image forming unit 12, a transport unit 14, and a fixing device 90.

In the following description, the image forming unit 12, the transport unit 14, and the fixing device 90 of the image forming apparatus 10 will be described, and then a transfer cylinder 50, which is an example of a cylinder member, will be described.

Image Forming Unit

Referring to FIG. 1, the image forming unit 12 has a function of forming an ink image on the recording medium P. More specifically, the image forming unit 12 includes a transfer belt 30 that is an example of an intermediate transfer body; plural rollers 22 (two rollers 22 in the present exemplary embodiment); an opposing roller 24 that is an example of a rotating member; an adhesive-layer forming device 26; a particle supplying device 18; plural discharge heads 20; a transfer body 40; and a cleaner 28.

The transfer belt 30 has an endless shape, and is wrapped around the two rollers 22 and the opposing roller 24 to form an inverted triangular shape when viewed in the front-back direction. At least one of the two rollers 22 is rotated so that the transfer belt 30 is circulated in the direction of arrow A.

The adhesive-layer forming device 26, the particle supplying device 18, the discharge heads 20, the transfer body 40, and the cleaner 28 are arranged on the outer peripheral surface of the transfer belt 30 in that order from an upstream side in a direction in which the transfer belt 30 is circulated (hereinafter referred to as "belt circulation direction".

The adhesive-layer forming device 26 is disposed at an end of a horizontal portion of the transfer belt 30 in the inverted triangular shape at one side (left side in FIG. 1) in the width direction of the apparatus. The adhesive-layer forming device 26 contains an adhesive, and applies the adhesive to the outer peripheral surface of the transfer belt 30 that is circulated to form an adhesive layer (not illustrated). The adhesive may be, for example, a glue or an organic solvent.

The particle supplying device 18 is disposed on the horizontal portion of the transfer belt 30 at a location downstream of the adhesive-layer forming device 26 in the belt circulation direction (on the right side in FIG. 1). The particle supplying device 18 contains ink receptive particles 16 capable of receiving ink droplets, and supplies the ink receptive particles 16 to the transfer belt 30 on which the adhesive layer is formed.

The ink receptive particles 16 supplied to the transfer belt 30 by the particle supplying device 18 are retained on the adhesive layer by the adhesion of the adhesive layer, thereby forming an ink receptive particle layer 16A on the transfer belt 30.

The discharge heads 20 are arranged on the horizontal portion of the transfer belt 30 at locations downstream of the particle supplying device 18 in the belt circulation direction (on the right side in FIG. 1). The discharge heads 20 are provided to form ink images of respective colors. In the present exemplary embodiment, four discharge heads 20 for four colors, which are yellow (Y), magenta (M), cyan (C), and black (K), are provided. In FIG. 1, the letters Y, M, C, and K representing the respective colors are appended to the reference numeral 20.

The discharge heads 20 of the respective colors each form an ink image based on image data by discharging ink droplets from nozzles (not illustrated) toward the ink receptive particle layer 16A by a known method, such as a thermal method or a piezoelectric method. The ink droplets discharged from the discharge heads 20 of the respective colors are received by the ink receptive particle layer 16A, and thereby form an ink image.

Figure 2:
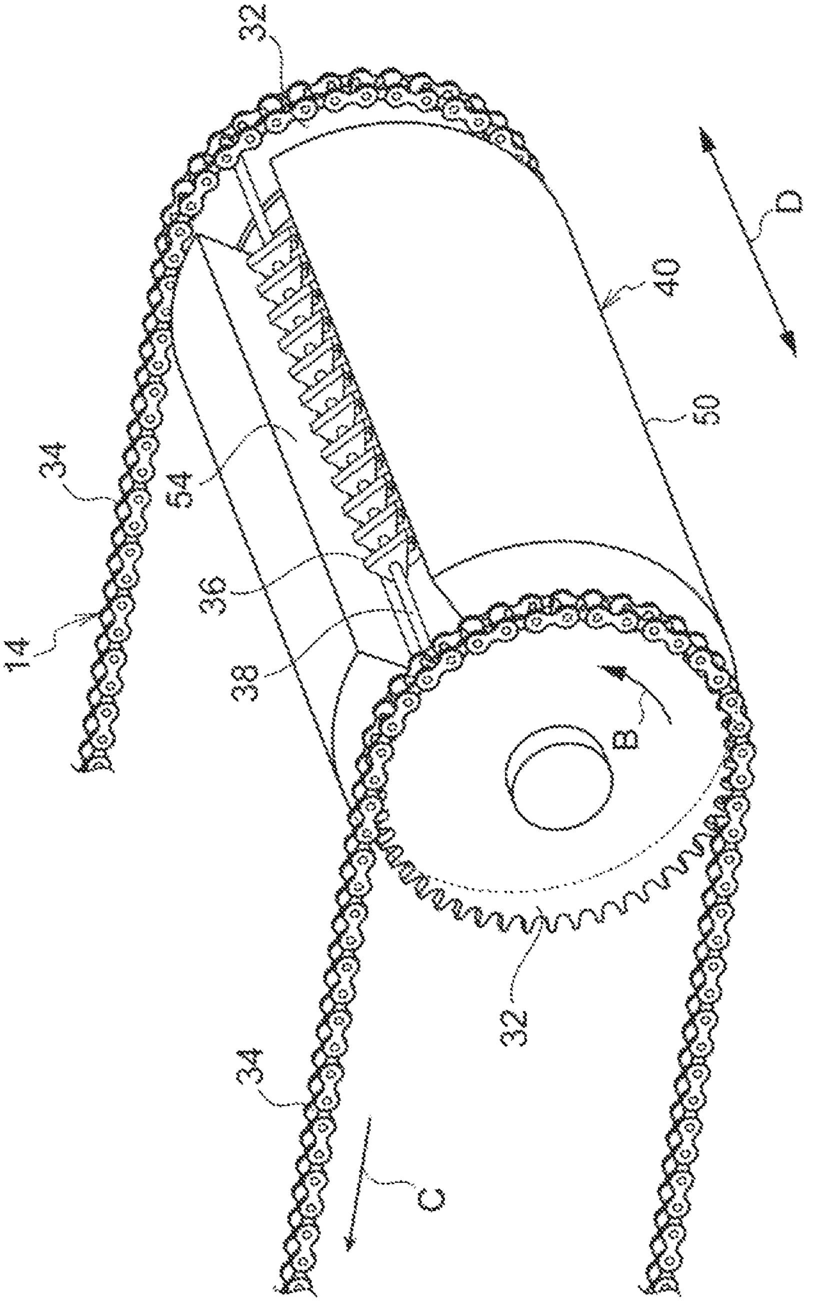
FIG. 2 is a perspective view illustrating the structure of a transfer body according to the exemplary embodiment.

The transfer body 40 is disposed below the transfer belt 30. As illustrated in FIG. 2, the transfer body 40 includes the transfer cylinder 50 disposed such that the axial direction thereof is the same as the axial direction of the opposing roller 24. The transfer cylinder 50 is disposed to face the transfer belt 30, and forms a nip region T in which the transfer belt 30 is nipped between the transfer cylinder 50 and the opposing roller 24.

In the present exemplary embodiment, the transfer belt 30 is circulated so that the ink image formed on the ink receptive particle layer 16A is transported to the nip region T, and the recording medium P is also transported to the nip region T by the transport unit 14. The transfer cylinder 50 and the transfer belt 30 nip and press the recording medium P and the ink image transported to the nip region T, so that the ink image is transferred to the recording medium P.

In FIG. 1, a transporting direction in which the recording medium P is transported is shown by arrow X. When the recording medium P and the ink image are nipped and pressed between the transfer belt 30 and the transfer cylinder 50 in the nip region T, the recording medium P and the ink image may be heated by the transfer cylinder 50. A recess 54 for receiving grippers 36 and support members 38 described below is formed in a portion of the outer peripheral surface of the transfer cylinder 50.

As illustrated in FIG. 2, a pair of sprockets 32 are provided at both ends of the transfer cylinder 50 in the axial direction. The pair of sprockets 32 are arranged coaxially with the transfer cylinder 50 and configured to rotate together with the transfer cylinder 50. The transfer cylinder 50 is rotated by a driving unit (not illustrated). A pair of chains 34 described below are wrapped around the pair of sprockets 32.

As illustrated in FIG. 1, the cleaner 28 is disposed downstream of the nip region T in the belt circulation direction and upstream of the adhesive-layer forming device 26 in the belt circulation direction. The cleaner 28 includes a blade 28A that is in contact with the outer peripheral surface of the transfer belt 30. When the transfer belt 30 is circulated, the cleaner 28 removes the adhesive layer, the ink receptive particles 16, the ink, and other foreign substances (for example, paper dust when the recording medium P is paper) that have passed through the nip region T and remained on the transfer belt 30 with the blade 28A.

The opposing roller 24 is movable between a contact position, at which the opposing roller 24 is in contact with the transfer cylinder 50, and a separated position, at which the opposing roller 24 is separated from the transfer cylinder 50, by a transfer moving mechanism (not illustrated) including, for example, a cam. More specifically, the opposing roller 24 is constantly urged or pulled toward the contact position by an elastic force of an elastic member, such as a spring, and is moved to the separated position against the elastic force by the transfer moving mechanism.

Fixing Device

As illustrated in FIG. 1, the fixing device 90 is a device that fixes the ink image that has been transferred to the recording medium P to the recording medium P. More specifically, the fixing device 90 includes a pressing member 42 and a heating roller 92 disposed in a downstream section of the transport unit 14 in the transporting direction of the recording medium P.

Figure 3:
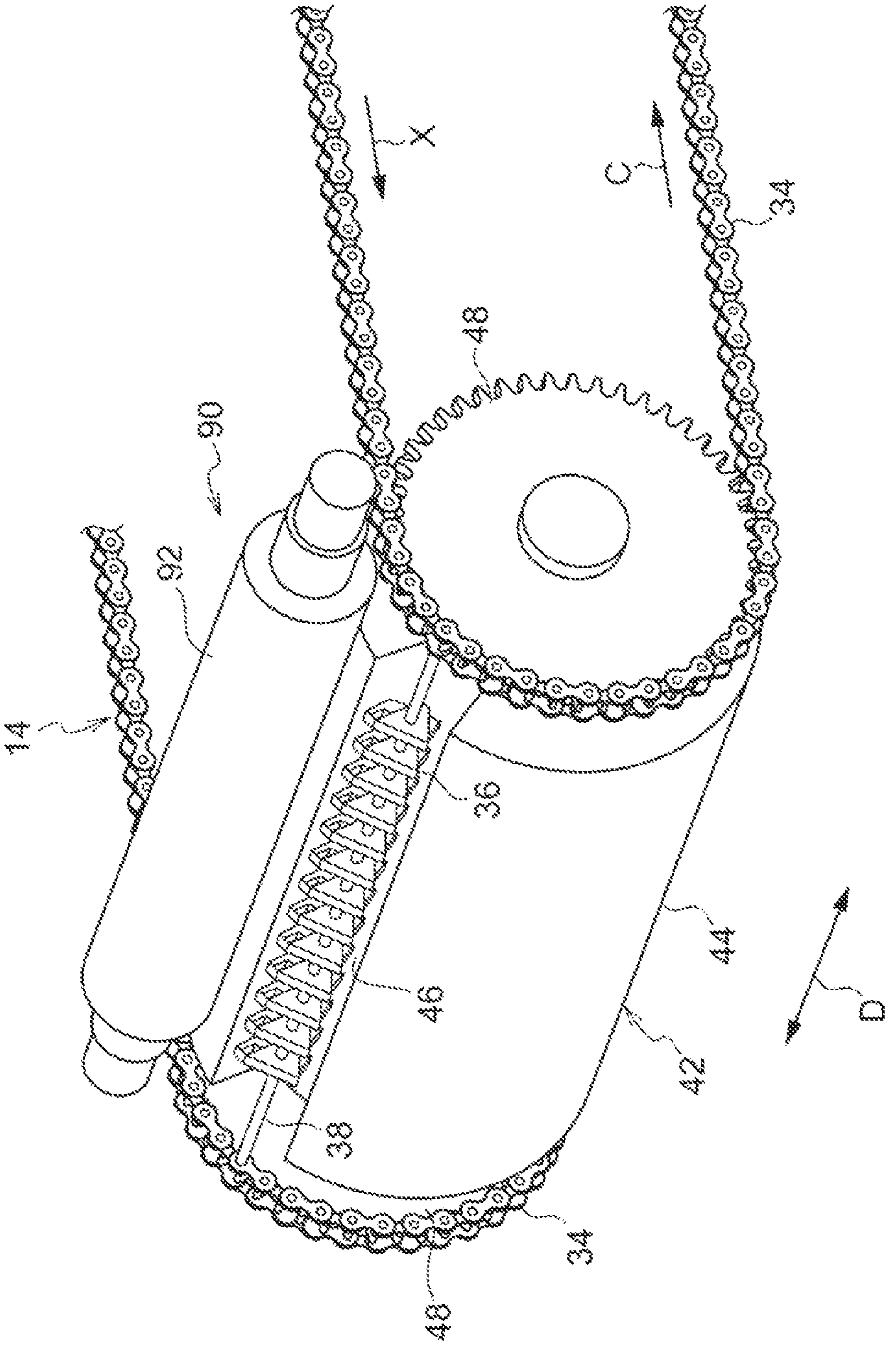
FIG. 3 is a perspective view illustrating the structure of a fixing device according to the exemplary embodiment.

As illustrated in FIG. 3, the pressing member 42 includes a pressing roller 44 disposed such that the axial direction thereof is the same as the axial direction of the transfer cylinder 50. A pair of sprockets 48 are provided at both ends of the pressing roller 44 in the axial direction. The pair of sprockets 48 are arranged coaxially with the pressing roller 44 and configured to rotate together with the pressing roller 44. The chains 34 described below are wrapped around the pair of sprockets 48.

As illustrated in FIG. 1, the heating roller 92 and the pressing roller 44 are arranged next to each other in the vertical direction. More specifically, the heating roller 92 is disposed above the pressing roller 44. The heating roller 92 has a heating source 90A (see FIG. 1), such as a halogen lamp, disposed therein. In the following description, a position at which the recording medium P is nipped between the heating roller 92 and the pressing roller 44 is referred to as a nip position NP.

The heating roller 92 is movable between a contact position, at which the heating roller 92 is in contact with the pressing roller 44, and a separated position, at which the heating roller 92 is separated from the pressing roller 44, by a fixation moving mechanism (not illustrated) including, for example, a cam. More specifically, the heating roller 92 is constantly urged or pulled toward the contact position by an elastic force of an elastic member, such as a spring, and is moved to the separated position against the elastic force by the fixation moving mechanism. The heating roller 92 and the pressing roller 44 nip the recording medium P therebetween when the heating roller 92 is at the contact position.

In the present exemplary embodiment, the heating roller 92 is driven to rotate, and the pressing roller 44 is rotated accordingly. However, both the heating roller 92 and the pressing roller 44 may be driven to rotate. A recess 46 for receiving the grippers 36 and the support members 38 described below is formed in a portion of the outer peripheral surface of the pressing roller 44.

Transport Unit

Referring to FIGS. 1 to 3, the transport unit 14 has a function of transporting the recording medium P so that the recording medium P passes through the nip region T and the nip position NP. The transport unit 14 includes the pair of chains 34 and the grippers 36. The pair of chains 34 are examples of a driving-force-transmitting member, and the grippers 36 are examples of a holding member that holds a leading end portion of the recording medium P. In FIG. 1, the chains 34 and the grippers 36 are simplified.

As illustrated in FIG. 1, each of the pair of chains 34 is loop-shaped. As illustrated in FIGS. 2 and 3, the pair of chains 34 are arranged in the depth direction of the apparatus with an interval therebetween. More specifically, the pair of chains 34 are wrapped around the pair of sprockets 32 arranged coaxially with the transfer cylinder 50 and the pair of sprockets 48 arranged coaxially with the pressing roller 44.

When the transfer cylinder 50 is rotated by the driving unit (not illustrated), the pair of sprockets 32 are rotated together with the transfer cylinder 50 in a rotation direction B (direction of arrow B), so that the chains 34 are circulated in a circulation direction C (direction of arrow C). Accordingly, the pressing roller 44 is rotated. Thus, rotational driving force of the transfer cylinder 50 is transmitted to the pressing roller 44 by the pair of chains 34 that are circulated in the circulation direction C (see FIG. 1).

Referring to FIGS. 2 and 3, each of the support members 38 having the grippers 36 attached thereto extends between the pair of chains 34 in the depth direction of the apparatus. The support members 38 (three support members 38 in FIG. 1) are arranged in the circumferential direction (circulation direction C) of the chains 34 with predetermined intervals therebetween, and are fixed to the pair of chains 34.

Each support member 38 has plural grippers 36 arranged therealong with predetermined intervals in the depth direction of the apparatus. In other words, the grippers 36 are attached to the chains 34 by the support member 38. The grippers 36 have a function of holding the leading end portion of the recording medium P.

Figure 4:
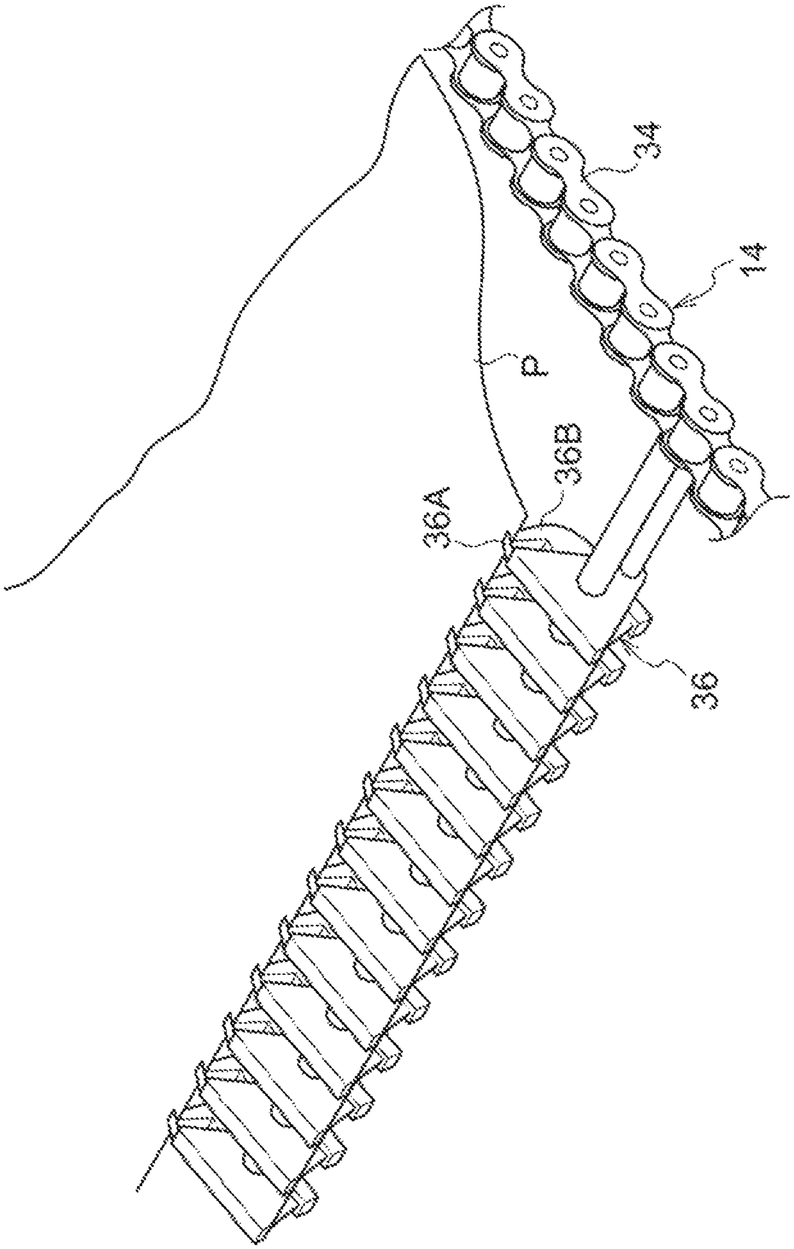
FIG. 4 is a perspective view of grippers according to the exemplary embodiment.

More specifically, as illustrated in FIG. 4, each gripper 36 includes a lug 36A and a lug base 36B. The gripper 36 holds the recording medium P by pinching the leading end portion of the recording medium P between the lug 36A and the lug base 36B. Thus, the gripper 36 serves as an example of a pinching portion that pinches the recording medium P in the thickness direction.

The grippers 36 are disposed downstream of the recording medium P in the transporting direction and hold the leading end portion of the recording medium P from the downstream side in the transporting direction of the recording medium P. Each gripper 36 is configured such that, for example, the lug 36A is pressed against the lug base 36B with a spring or the like, and is moved away from the lug base 36B by an operation of a cam or the like.

As described above, the grippers 36 of the transport unit 14 hold the leading end portion of the recording medium P fed from a storage unit (not illustrated). In addition, the chains 34 of the transport unit 14 circulate in the circulation direction C while the leading end portion of the recording medium P is held by the grippers 36, so that the grippers 36 are moved to transport the recording medium P and that the recording medium P held by the grippers 36 pass through the nip region T together with the grippers 36.

In a region in which the chains 34 are wrapped around the sprockets 32, the grippers 36 are disposed in the recess 54 in the transfer cylinder 50 and moved in the rotation direction of the transfer cylinder 50 together with the transfer cylinder 50. Similarly, in a region in which the chains 34 are wrapped around the sprockets 48, the grippers 36 are disposed in the recess 46 in the pressing roller 44 and moved in the rotation direction of the pressing roller 44 together with the pressing roller 44.

The transport unit 14 according to the present exemplary embodiment is configured to transport the recording medium P toward the nip position NP while the leading end portion of the recording medium P is held by the grippers 36 and while the heating roller 92 is at the separated position. The transport unit 14 is configured to release the leading end portion of the recording medium P when the recording medium P is transported to the nip position NP.

More specifically, the grippers 36 of the transport unit 14 release the leading end portion of the recording medium P after the leading end portion of the recording medium P passes through the nip position NP. At this time, the pressing roller 44 is continuously rotated, in other words, circulation of the chains 34 is maintained.

It is determined that the recording medium P has been transported to the nip position NP based on the time from detection of the leading end of the recording medium P by a detector disposed upstream of the nip position NP in the transporting direction. The support members 38 or the grippers 36 may be detected by the detector instead of the leading end of the recording medium P.

After the grippers 36 have passed through the nip position NP and released the leading end portion of the recording medium P, the heating roller 92 starts to move from the separated position to the contact position so that the recording medium P transported to the nip position NP is nipped between the heating roller 92 and the pressing roller 44. The heating roller 92 starts to rotate to transport the recording medium P while the recording medium P is nipped between the heating roller 92 and the pressing roller 44.

The heating roller 92 may instead start to move from the separated position to the contact position before the grippers 36 release the leading end portion of the recording medium P as long as nipping of the recording medium P by the heating roller 92 and the pressing roller 44 is completed after the leading end portion of the recording medium P is released from the grippers 36.

Thus, the fixing device 90 applies heat and pressure to the recording medium P while the recording medium P is nipped between the heating roller 92 and the pressing roller 44 and transported, and thereby fixes the ink image that has been transferred to the recording medium P to the recording medium P.

Transfer Cylinder

The transfer cylinder 50 will now be described.

Figure 6:
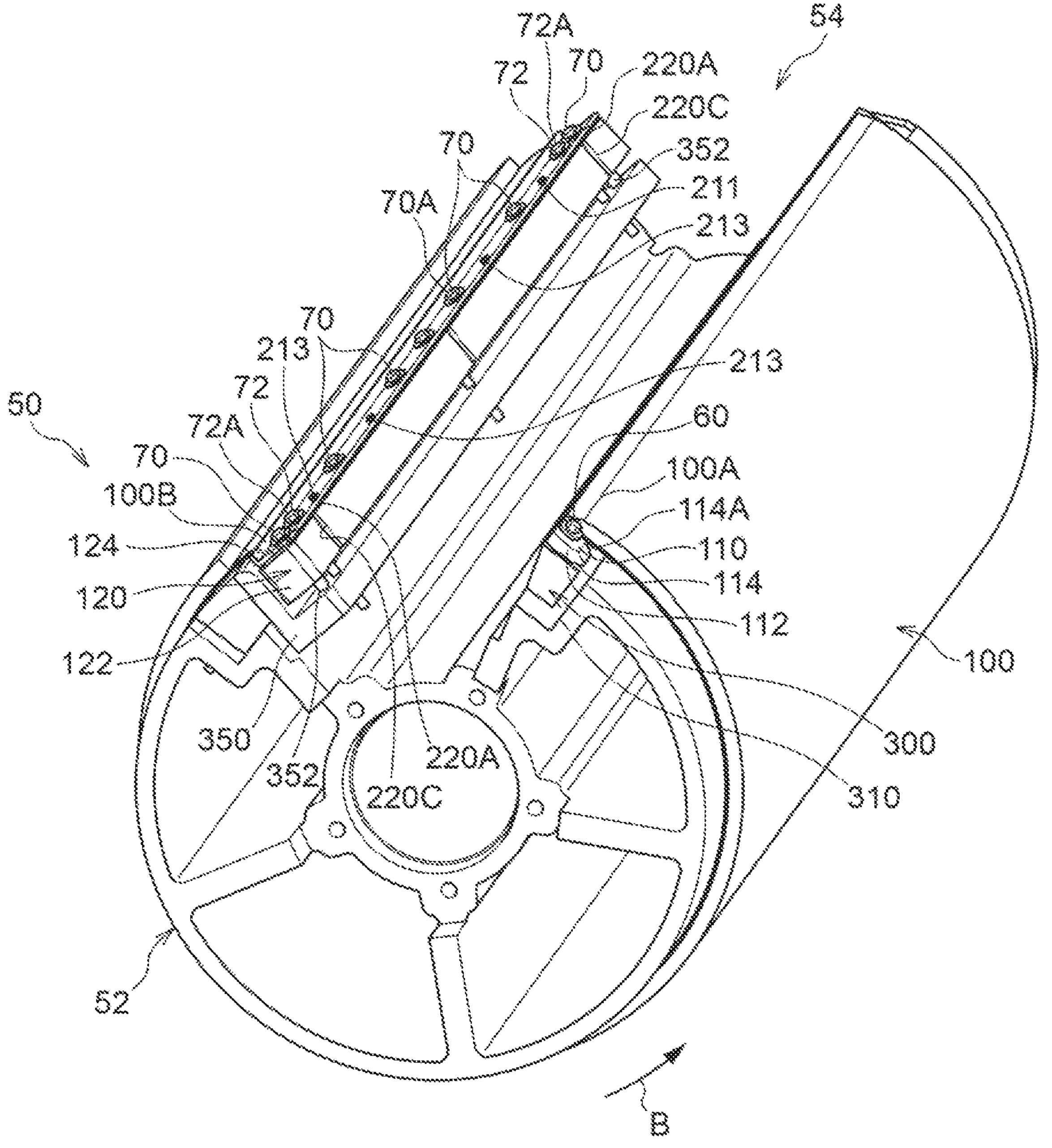
FIG. 6 is a perspective view of a transfer cylinder according to the exemplary embodiment.
Figure 11:
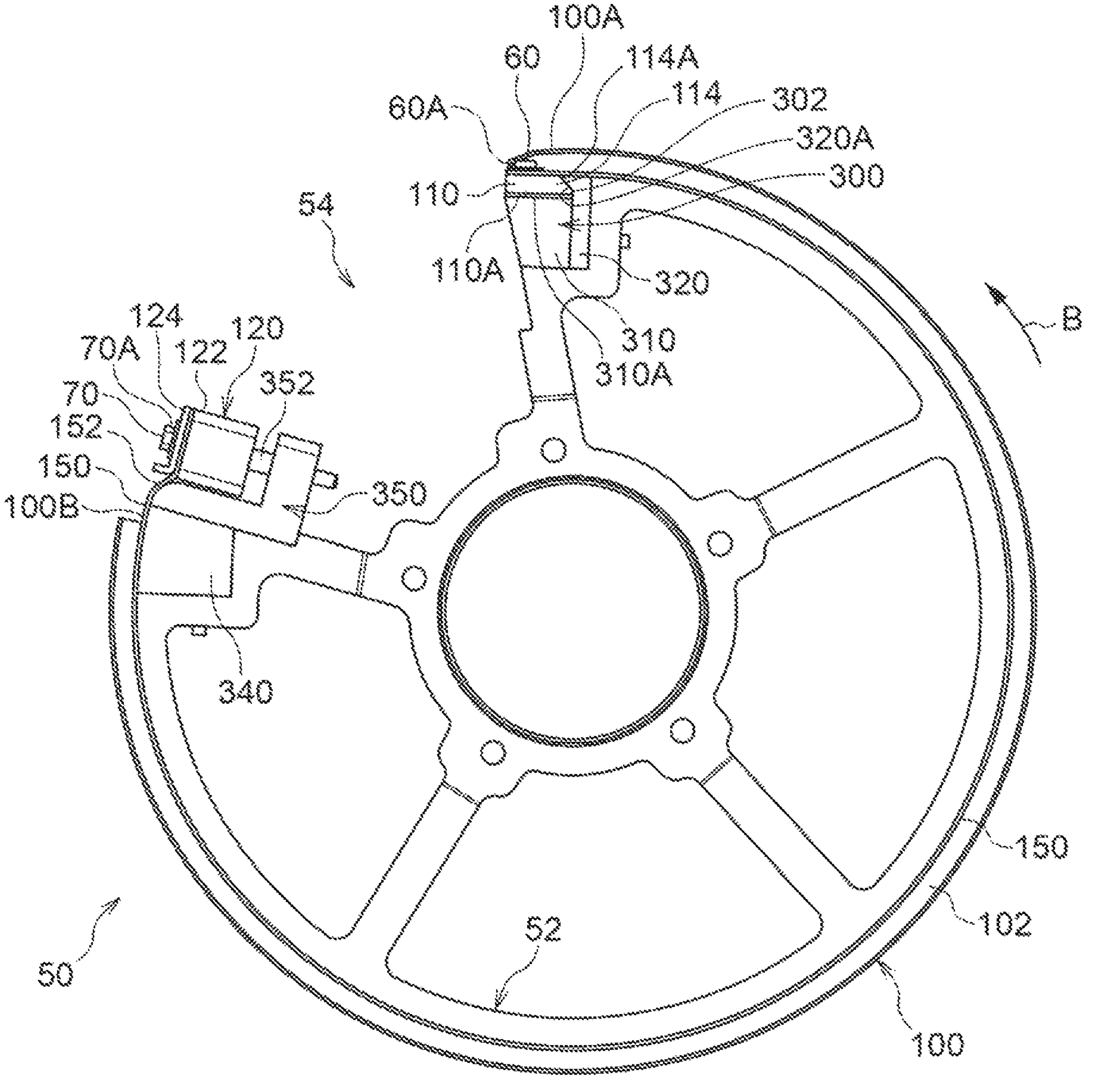
FIG. 11 is an end view of the transfer cylinder according to the exemplary embodiment viewed in the axial direction.

As illustrated in FIGS. 6 and 11, the transfer cylinder 50, which is an example of a cylinder member, includes a cylinder body 52 and a sheet member 100 wrapped around the cylinder body 52. In the following description, the axial direction, the radial direction, and the circumferential direction of the cylinder body 52 may be referred to simply as "axial direction", "radial direction", and "circumferential direction", respectively.

In addition, in the following description, upstream in the rotation direction of the transfer cylinder 50 (direction of arrow B) may be referred to simply as "upstream", and downstream in the rotation direction of the transfer cylinder 50 (direction of arrow B) may be referred to simply as "downstream". When the sheet member 100 is described with reference to a circumferential direction and an axial direction, these directions are those in the state in which the sheet member 100 is wrapped around the cylinder body 52. The direction along the short sides of the sheet member 100 having a rectangular shape in plan view is defined as a width direction, and the direction along the long sides of the sheet member 100 is defined as a length direction.

The cylinder body 52 has a single recess 54, which extends in the axial direction, in a portion thereof at a certain location in the circumferential direction, and has a substantially circular cross section. More specifically, a cross section of the cylinder body 52 that is orthogonal to the axial direction has a substantially circular outline. The recess 54, which is an example of a dent portion, has a depth in the radial direction of the cylinder body 52. The cylinder body 52 is made of a metal material, such as stainless steel or aluminum. In the present exemplary embodiment, the depth direction of the recess 54 is the same as the radial direction. It is not necessary that the depth direction be the same as the radial direction. The depth direction may instead be at an angle of, for example, about 5° to about 10° with respect to the radial direction.

The length of the cylinder body 52 in the axial direction is greater than the width of the sheet member 100 in the axial direction, and the sheet member 100 is wrapped around the cylinder body 52 such that the center thereof in the width direction coincides with the center of the cylinder body 52 in the axial direction. The width of the sheet member 100 is greater than the maximum width of the recording medium P (see FIG. 4).

Here, the term "sheet shape" means the shape of, for example, a paper sheet or a thin plate with a thickness that allows deformation along the outer periphery of the cylinder body 52. The length of the sheet member 100 in the circumferential direction (length direction) is substantially equal to the length of the cylinder body 52 excluding the recess 54 in the circumferential direction.

As illustrated in FIG. 11, the sheet member 100 includes a metal layer 150 wrapped around the outer peripheral surface of the cylinder body 52 in contact therewith and an outer layer 102 provided on and bonded to the outer peripheral surface of the metal layer 150 (see also FIGS. 7 to 10 and other figures).

The metal layer 150 according to the present exemplary embodiment is made of a metal material, such as stainless steel, aluminum, or copper. In the present exemplary embodiment, the metal layer 150 has a thickness of, for example, 0.1 mm.

The outer layer 102 according to the present exemplary embodiment is made of a conductive resin material including, for example, solid rubber such as nitrile rubber, polychloroprene rubber, ethylene propylene diene rubber, acrylonitrile butadiene rubber, or silicone rubber, polyimide, polyamide-imide, polyurethane, polyethylene, or a mixture thereof. The thickness of the outer layer 102 according to the present exemplary embodiment is greater than that of the metal layer 150 and may be, for example, 7.0 mm.

As illustrated in FIGS. 6, 7, 10, 11, 12, and 13, a first attachment member 110 is provided on a first end portion 100A of the sheet member 100 in the length direction, and a second attachment member 120 is provided on a second end portion 100B of the sheet member 100 in the length direction.

In the present exemplary embodiment, the first attachment member 110 is bonded to the inner surface of the sheet member 100, that is, to the metal layer 150 by, for example, using an adhesive or double-sided tape or welding. The first attachment member 110 has the shape of a plate that is long in the axial direction and has a thickness in the radial direction. The first attachment member 110 is made of a metal material, such as stainless steel or aluminum.

Figure 12:
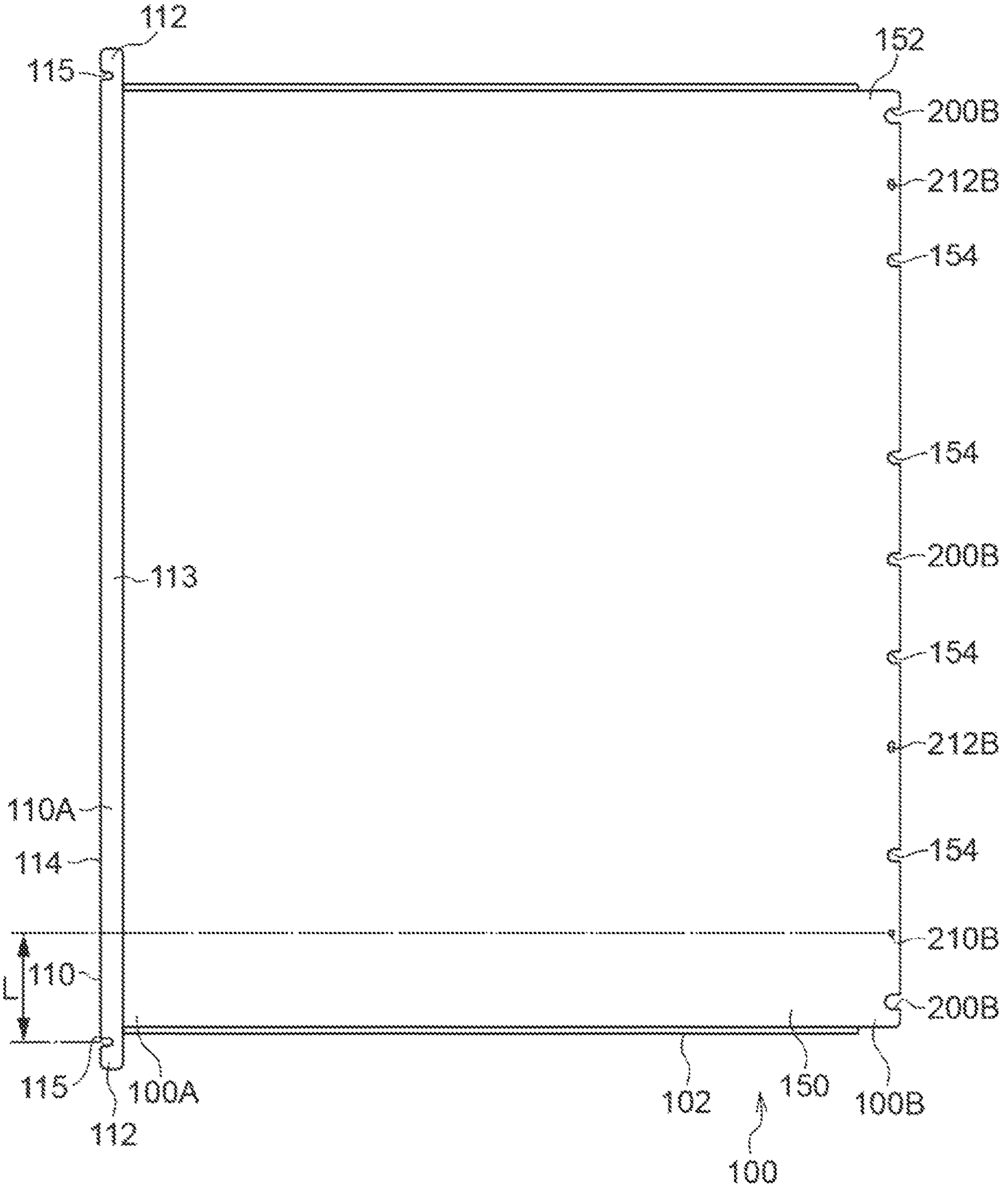
FIG. 12 is a plan view of the sheet member according to the exemplary embodiment viewed from a side at which a metal layer is provided.

As illustrated in FIG. 12, the first attachment member 110 includes a pair of protruding portions 112 that protrude from both sides of the sheet member 100 in the axial direction and a central portion 113 that constitutes a portion between the pair of protruding portions 112. The central portion 113 is disposed within the area of the sheet member 100 when viewed in the thickness direction of the sheet member 100, that is, in the radial direction. In other words, the entirety of the central portion 113 overlaps the sheet member 100 when viewed in the thickness direction of the sheet member 100. In the present exemplary embodiment, the downstream end of the sheet member 100 and the downstream end of the first attachment member 110 overlap when viewed in the thickness direction of the sheet member 100.

The pair of protruding portions 112 have first receiving holes 115 through which attachment screws 60 (see FIGS. 6, 10, and 11) are inserted. The first receiving holes 115 according to the present exemplary embodiment are U-shaped and open at a second side in the circumferential direction.

Figure 7:
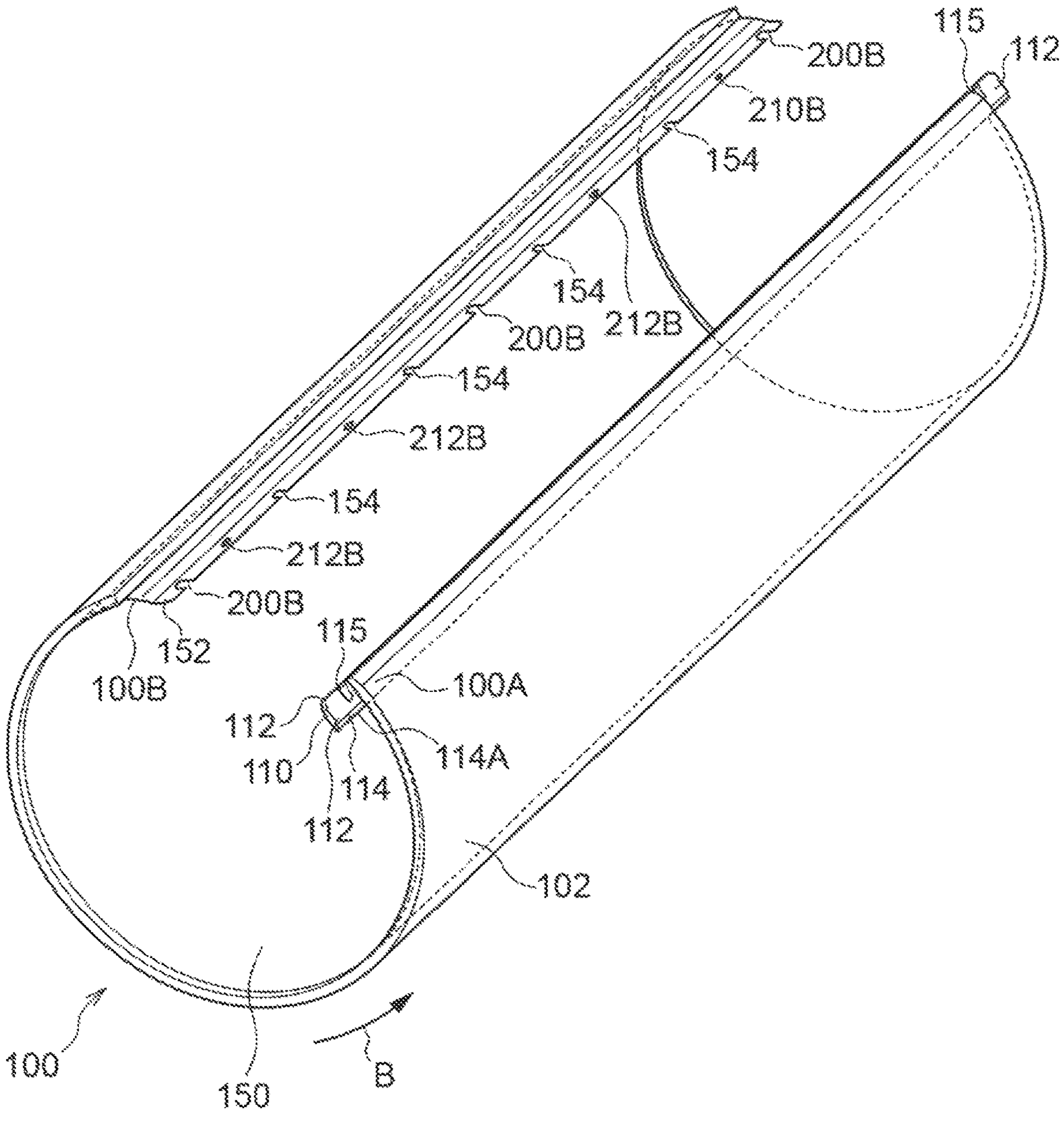
FIG. 7 is a perspective view of a sheet member according to the exemplary embodiment.

As illustrated in FIGS. 7 and 11, the first attachment member 110 has a projecting portion 114 at a first side (upstream side) thereof in the circumferential direction. The projecting portion 114 projects toward the first side and has a triangular shape when viewed in the axial direction (see also FIG. 10).

Figure 10:
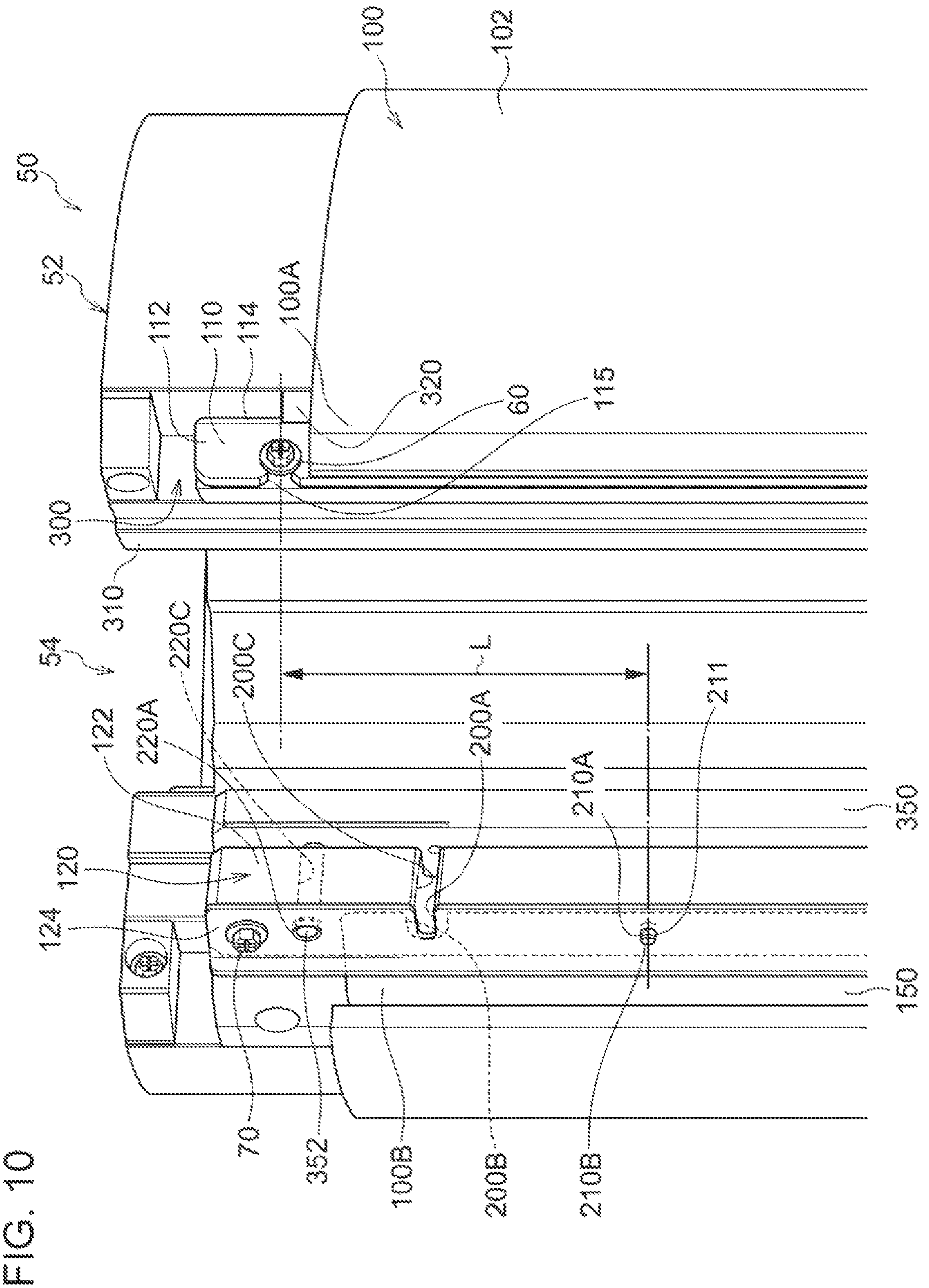
FIG. 10 is an enlarged perspective view of the recess in the transfer cylinder according to the exemplary embodiment at the end illustrated in FIG. 8.

As illustrated in FIGS. 7 and 12, the second end portion 100B of the sheet member 100 includes an end portion 152, which is a portion of the metal layer 150 that protrudes from the outer layer 102 in the circumferential direction (see also FIGS. 10 and 11). The end portion 152 of the metal layer 150 has plural U-shaped fixing grooves 154, plural second receiving holes 200B, plural positioning holes 212B, and a positioning hole 210B, which are arranged in the axial direction with intervals therebetween. In the following description, the "end portion 152 of the metal layer 150" may be referred to as "metal-layer end portion 152".

The second receiving holes 200B according to the present exemplary embodiment are U-shaped and open at the first side in the circumferential direction. In addition, the positioning holes 212B are elongated holes that extend in the axial direction, and the positioning hole 210B, which is a circular hole, is as an example of a fitting portion.

As illustrated in FIGS. 6 and 8 to 11, the second attachment member 120 includes a plate-shaped fixing plate 124 that extends in the axial direction and a substantially quadrangular-prism-shaped fixed portion 122. The metal-layer end portion 152 of the second end portion 100B of the sheet member 100 is disposed between the fixing plate 124, which is an example of a fixing portion, and the fixed portion 122, and the fixing plate 124 and the fixed portion 122 are fastened together with fixing screws 70 (see FIG. 6) inserted through the fixing grooves 154 (see FIGS. 7 and 12), so that the metal-layer end portion 152 is fixed to the second attachment member 120.

Figure 8:
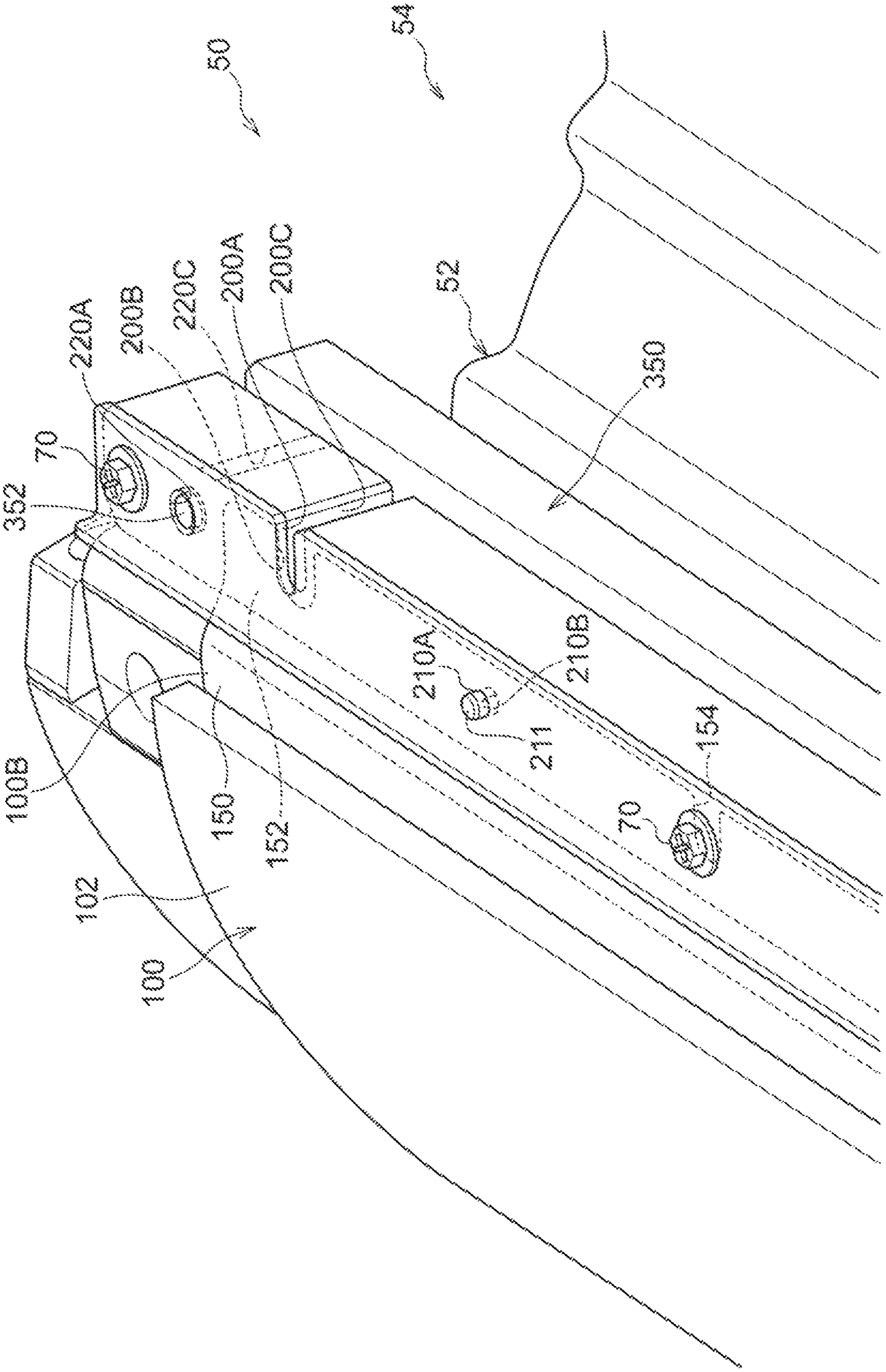
FIG. 8 is an enlarged perspective view of a second side of a recess in the transfer cylinder according to the exemplary embodiment at an end of the transfer cylinder in an axial direction.
Figure 9:
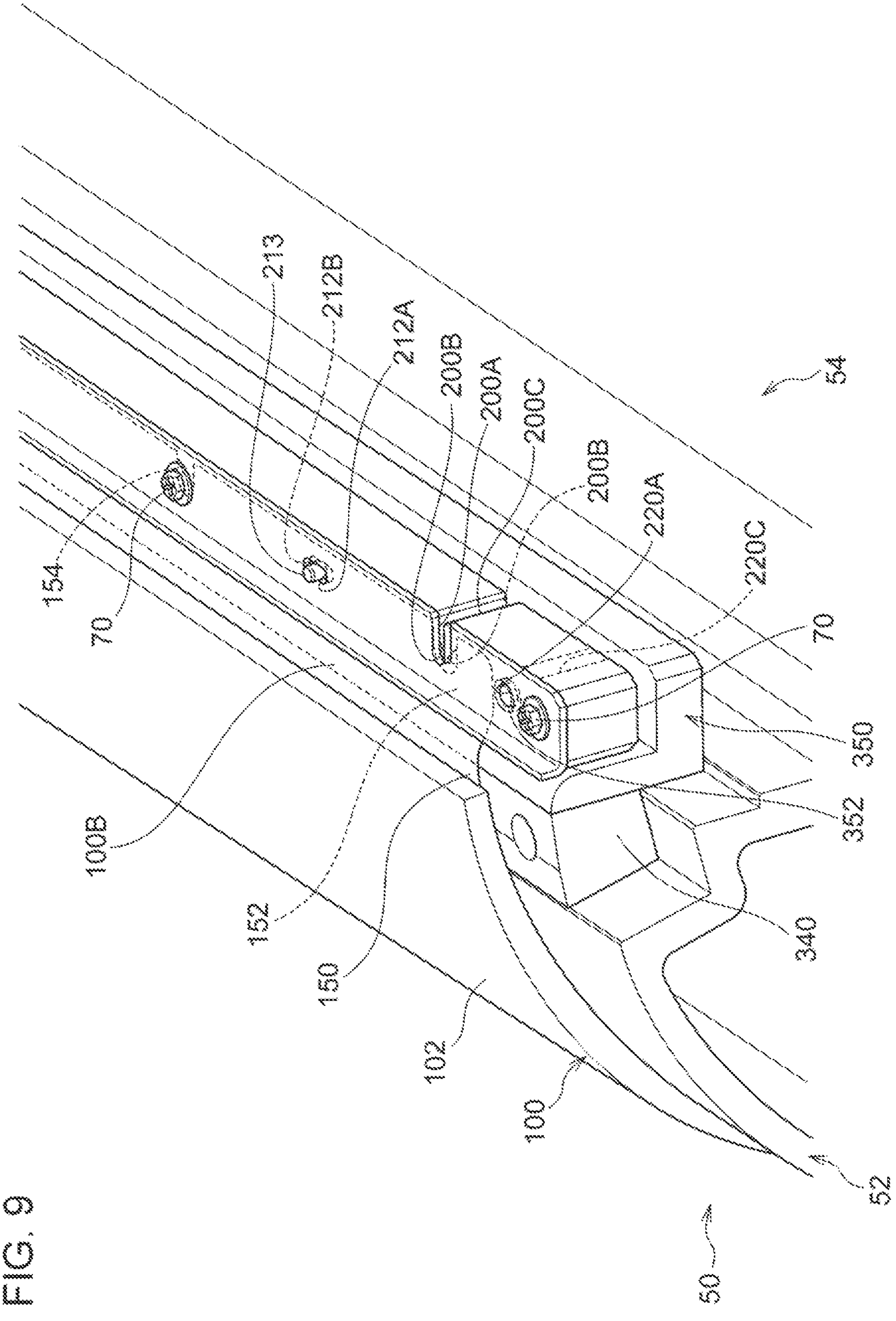
FIG. 9 is an enlarged perspective view of the second side of the recess in the transfer cylinder according to the exemplary embodiment at an end of the transfer cylinder opposite to the end illustrated in FIG. 8 in the axial direction.

As illustrated in FIGS. 8 to 10, the fixing plate 124 has a positioning hole 210A (see FIGS. 8 and 10), positioning holes 212A (see FIG. 9), second receiving holes 200A, and guide holes 220A, which are arranged in the axial direction with intervals therebetween. The fixed portion 122 has second receiving holes 200C and guide holes 220C arranged in the axial direction with intervals therebetween. The fixed portion 122 has a positioning pin 211 (FIGS. 8 and 10) and positioning pins 213 (see FIG. 9) that project outward in the depth direction (see also FIG. 6).

When the fixing plate 124 and the fixed portion 122 are fastened together with the fixing screws 70 with the metal-layer end portion 152 disposed therebetween, the second receiving holes 200A, the second receiving holes 200B, and the second receiving holes 200C, which have substantially the same size, are at the same positions and overlap each other. Similarly, the guide holes 220A and the guide holes 220C, which have substantially the same size, are at the same positions and overlap each other. The guide holes 220A and the guide holes 220C extend in the radial direction and have a circular shape in cross section.

When the fixing plate 124 and the fixed portion 122 are fastened together with the fixing screws 70 with the metal-layer end portion 152 disposed therebetween, the positioning holes 210A and 210B, which have substantially the same size, are at the same position and overlap each other, and the positioning holes 212A and 212B, which have substantially the same size, are also at the same positions and overlap each other.

As illustrated in FIG. 9, the positioning pins 213 are formed at the same positions as the positioning holes 212A and 212B and inserted through the positioning holes 212A and 212B. In addition, as illustrated in FIGS. 8 and 10, the positioning pin 211 is formed at the same position as the positioning holes 210A and 210B and fitted to the positioning holes 210A and 210B. Thus, the metal-layer end portion 152 is positioned relative to the second attachment member 120 in the circumferential direction and the axial direction.

Figure 13:
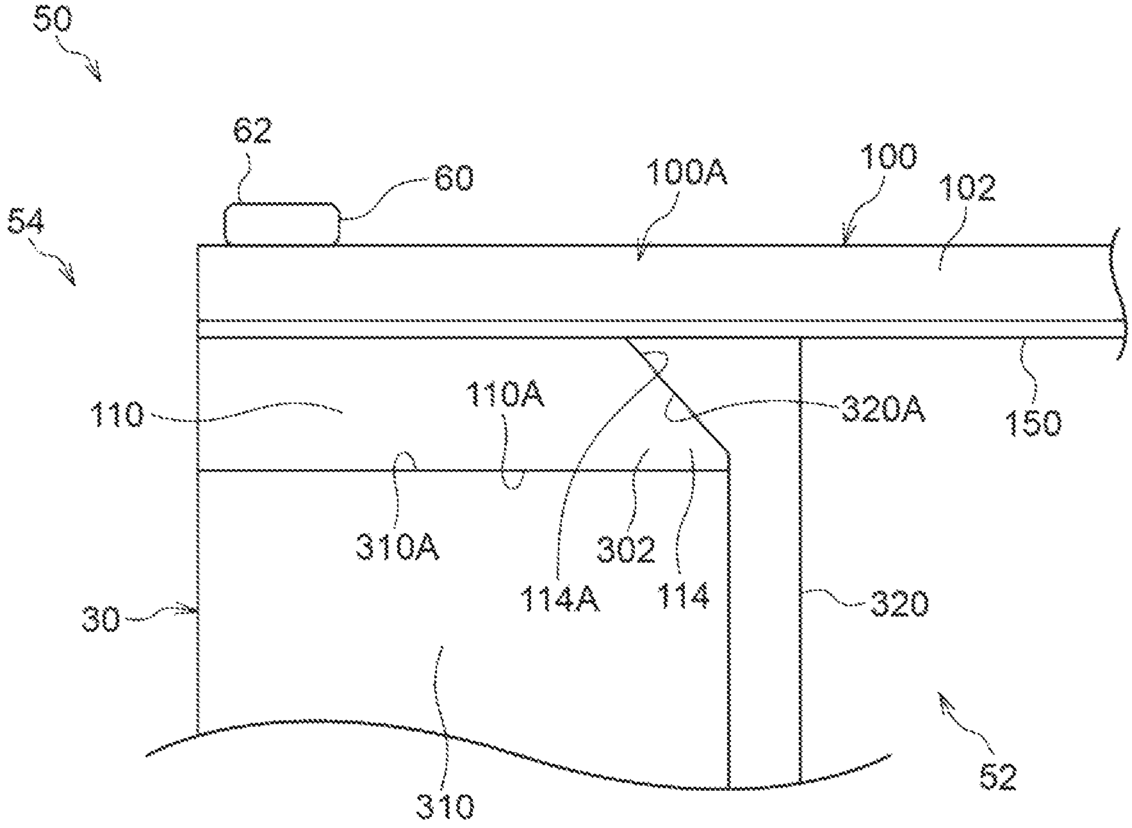
FIG. 13 is an enlarged end view of a first side of the recess illustrated in FIG. 11.

As illustrated in FIGS. 11 and 13, the recess 54 in the cylinder body 52 has a first base 300 at the first side (upstream side) thereof in the circumferential direction. The first attachment member 110 on the first end portion 100A of the sheet member 100 is attached to the first base 300 (see also FIGS. 6 and 10). The first base 300 includes a body portion 310 and a wall portion 320 joined to the first side of the body portion 310 (see also FIG. 10). As illustrated in FIG. 10, the body portion 310 protrudes outward from the wall portion 320 in the axial direction. As illustrated in FIGS. 11 and 13, the wall portion 320 extends outward beyond a contact surface 310A of the body portion 310 described below in the radial direction.

The body portion 310 of the first base 300 has the contact surface 310A that is in contact with an attachment surface 110A (see also FIG. 12) of the first attachment member 110 at the inner side thereof in the radial direction. The wall portion 320 has an abutting surface 320A that is abutted against an inclined surface 114A of the projecting portion 114 (see also FIGS. 6 and 10) at the downstream side of the first attachment member 110 in the circumferential direction. The abutting surface 320A is inclined outward in the radial direction and toward the second side. In other words, the first base 300 has a recess 302 having a triangular cross section when viewed in the axial direction and serving as an example of a positioning portion at the first side thereof in the circumferential direction.

As illustrated in FIGS. 6 and 10, the attachment screws 60 are inserted through the first receiving holes 115 formed in the protruding portions 112 (see also FIGS. 7 and 12) of the first attachment member 110, and screwed into the body portion 310 of the first base 300, which is disposed in the recess 54 in the cylinder body 52, at both ends thereof in the axial direction. Thus, the first end portion 100A of the sheet member 100 is attached to the first base 300 disposed in the recess 54.

In this state, as illustrated in FIGS. 11 and 13, the attachment surface 110A of the first attachment member 110 is in contact with the contact surface 310A of the first base 300. In addition, the projecting portion 114 of the first attachment member 110 is inserted into and abutted against the recess 302 in the circumferential direction such that the inclined surface 114A comes into contact with the abutting surface 320A.

The first attachment member 110 may be removed from the first base 300 by removing the attachment screws 60. As described above, the first receiving holes 115 according to the present exemplary embodiment are U-shaped and open at the second side in the circumferential direction. Therefore, when the attachment screws 60 inserted through the first receiving holes 115 are loosened, the first attachment member 110 is movable toward the second side (downstream side) in the circumferential direction.

As illustrated in FIGS. 6 and 8 to 11, the recess 54 in the cylinder body 52 has a second base 350 at the second side (downstream side) thereof in the circumferential direction. The second attachment member 120 on the second end portion 100B of the sheet member 100 is attached to the second base 350.

In the present exemplary embodiment, the second base 350 is joined to a support portion 340 (see FIGS. 9 and 11) provided in the recess 54. The second base 350 is L-shaped when viewed in the axial direction, and has guide pins 352 that project outward in the radial direction. As illustrated in FIG. 6, the guide pins 352 are provided at both ends of the second base 350 in the axial direction (see also FIGS. 8 and 9).

The guide pins 352 on the second base 350 disposed in the recess 54 in the cylinder body 52 are inserted through the guide holes 220A and 220C (see FIGS. 8 to 10) in the second attachment member 120 so that the second attachment member 120 is positioned in the circumferential direction and the axial direction while being movable in the radial direction.

Tension-applying screws 72 (see FIG. 6), which are examples of a tension-applying mechanism, are inserted through the second receiving holes 200A, 200B, and 200C and screwed into the second base 350 so that the second attachment member 120 is moved in the depth direction along the guide pins 352 and the guide holes 220A and 220C and fixed. Accordingly, the metal-layer end portion 152 of the sheet member 100 is pulled in the depth direction, so that tension is applied to the metal layer 150 and that the second attachment member 120 is attached to the second base 350. The tension-applying screws 72 have head portions 72A (see FIG. 6) larger than the second receiving holes 200A, 200B, and 200C.

The second attachment member 120 may be removed from the second base 350 by removing the tension-applying screws 72. As described above, the second receiving holes 200A, 200B, and 200C according to the present exemplary embodiment are U-shaped and open at the first side in the circumferential direction. Therefore, when the tension-applying screws 72 inserted through the second receiving holes 200A, 200B, and 200C are loosened, the second attachment member 120 is movable toward the second side in the circumferential direction.

As illustrated in FIGS. 10 and 12, the sheet member 100 according to the present exemplary embodiment is formed such that the center position of one of the first receiving holes 115 in the first attachment member 110 in the axial direction is at a distance of L from the center position of the positioning hole 210B in the metal-layer end portion 152 in the axial direction. Thus, the center position of the first receiving hole 115 in the first attachment member 110 in the axial direction is set by using the center position of the positioning hole 210B in the metal-layer end portion 152 in the axial direction as a reference.

Operation of Present Exemplary Embodiment

The operation of the present exemplary embodiment will now be described.

The tension-applying screws 72 are inserted through the second receiving holes 200A, 200B, and 200C in the second attachment member 120 provided on the second end portion 100B of the sheet member 100, and screwed into the second base 350 disposed in the recess 54 in the cylinder body 52, so that the second attachment member 120 is moved in the depth direction along the guide pins 352 and the guide holes 220A and 220C and fixed. Accordingly, the metal-layer end portion 152 of the sheet member 100 is pulled in the depth direction, so that tension is applied to the metal layer 150. Since tension is applied to the metal layer 150, the sheet member 100 comes into close contact with the cylinder body 52.

In this state, the metal-layer end portion 152 of the second end portion 100B of the sheet member 100 has the positioning pins 213 inserted through the positioning holes 212A and 212B, which are elongated holes that extend in the axial direction, and the positioning pin 211 fitted to the positioning holes 210A and 210B, which are circular holes. Accordingly, the metal-layer end portion 152 is positioned relative to the second attachment member 120 in the circumferential direction and the axial direction.

In addition, the guide pins 352 on the second base 350 disposed in the recess 54 in the cylinder body 52 are inserted through the guide holes 220A and 220C in the second attachment member 120 so that the second attachment member 120 is positioned in the circumferential direction and the axial direction while being movable in the depth direction (radial direction).

The metal-layer end portion 152 of the second end portion 100B of the sheet member 100 is disposed between the fixing plate 124 and the fixed portion 122 of the second attachment member 120, and the fixing plate 124 and the fixed portion 122 are fastened together with the fixing screws 70 (see FIG. 6) inserted through the fixing grooves 154, so that the metal-layer end portion 152 is fixed to the second attachment member 120.

The center position of one of the first receiving holes 115 in the first attachment member 110 on the first end portion 100A of the sheet member 100 in the axial direction is at the distance of L from the center position of the positioning hole 210B in the metal-layer end portion 152 of the second end portion 100B in the axial direction. Thus, the center position of the first receiving hole 115 in the first attachment member 110 in the axial direction is determined by using the center position of the positioning hole 210B in the metal-layer end portion 152 in the axial direction as a reference.

The attachment screws 60 are inserted through the first receiving holes 115 formed in the protruding portions 112 of the first attachment member 110 on the first end portion 100A of the sheet member 100, and screwed into the body portion 310 of the first base 300, which is disposed in the recess 54 in the cylinder body 52, at both ends thereof in the axial direction. Thus, the first end portion 100A of the sheet member 100 is attached to the first base 300 disposed in the recess 54.

The first attachment member 110 on the first end portion 100A of the sheet member 100 includes the pair of protruding portions 112 that protrude from both sides of the sheet member 100 in the axial direction and the central portion 113 that constitutes a portion between the pair of protruding portions 112. The central portion 113 is disposed within the area of the sheet member 100 when viewed in the thickness direction of the sheet member 100, that is, in the radial direction. In other words, the entirety of the central portion 113 overlaps the sheet member 100 when viewed in the thickness direction of the sheet member 100.

The projecting portion 114 of the first attachment member 110 on the first end portion 100A of the sheet member 100 is inserted into the recess 302 so that the inclined surface 114A is abutted against the abutting surface 320A.

In the image forming apparatus 10 according to the present exemplary embodiment, the metal-layer end portion 152 of the second end portion 100B of the sheet member 100 included in the transfer body 40 is positioned relative to the second attachment member 120 in the circumferential direction and the axial direction.

Another Image Forming Apparatus

Figure 5:
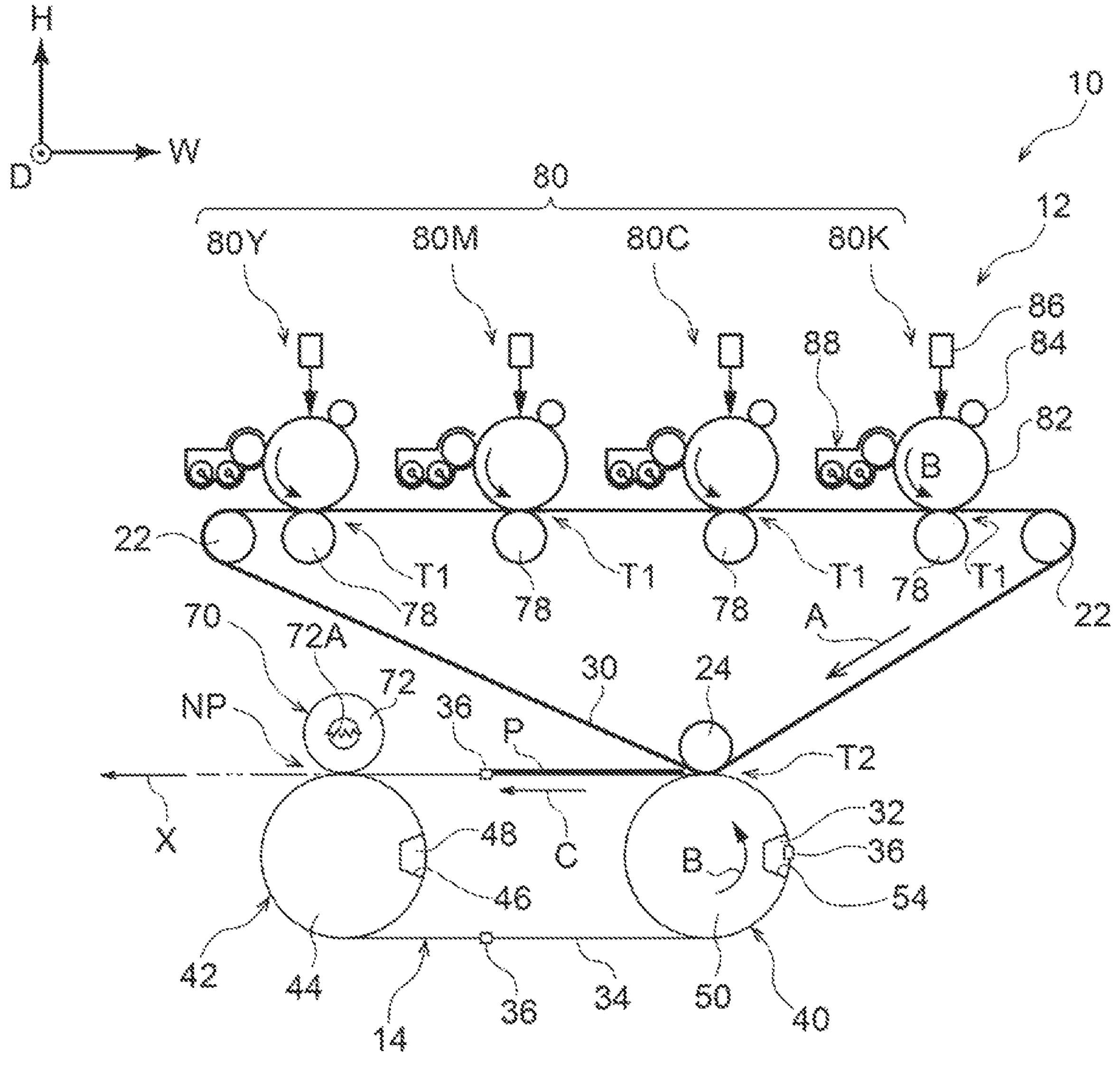
FIG. 5 is a schematic diagram illustrating the structure of another image forming apparatus according to the exemplary embodiment.

The image forming apparatus 10 according to the present exemplary embodiment is not limited to the above-described inkjet image forming apparatus, and may instead be, for example, an electrophotographic image forming apparatus illustrated in FIG. 5. In other words, toner image forming units 80 that form toner images of respective colors (examples of an image) may be provided instead of the adhesive-layer forming device 26, the particle supplying device 18, and the discharge heads 20.

The toner image forming units 80 (80Y, 80M, 80C, and 80K) each include a cylindrical photoconductor 82 that rotates in one direction (direction of arrow B). A charging device 84, an exposure device 86, and a developing device 88 are arranged around the photoconductor 82 in that order from the upstream side in the rotation direction of the photoconductor 82.

In each of the toner image forming units 80 of the respective colors, the charging device 84 charges the surface of the photoconductor 82, and the exposure device 86 exposes the surface of the photoconductor 82 charged by the charging device 84 with light, so that an electrostatic latent image is formed on the surface of the photoconductor 82. The developing device 88 develops the electrostatic latent image formed on the surface of the photoconductor 82 by the exposure device 86, so that a toner image is formed.

First transfer rollers 78 are provided on the inner peripheral surface of a transfer belt 30 so as to face respective ones of the photoconductors 82 with the transfer belt 30 disposed therebetween. The toner images formed by the toner image forming units 80 of the respective colors are successively transferred to the transfer belt 30 at first transfer positions T1, at which the first transfer rollers 78 are disposed, and superposed in a first transfer process. The superposed toner images are transferred to the recording medium P at a second transfer position T2 in a second transfer process.

Others

The present disclosure is not limited to the above-described exemplary embodiment, and design changes are possible as appropriate without departing from the gist of the present disclosure.

For example, although the tension-applying screws 72 are used as a tension-applying unit in the above-described exemplary embodiment, the tension-applying unit is not limited to this. For example, the second attachment member 120 may instead be attached to the second base 350 with a draw latch. Alternatively, the second attachment member 120 may instead be pulled in the depth direction by, for example, a tension spring.

The draw latch is a latch configured to join a part having a projection or the like and a part having a lever or the like together by engaging the lever with the projection and then laying the lever.

In addition, for example, although the metal-layer end portion 152 of the second end portion 100B of the sheet member 100 is positioned by fitting the positioning pin 211 to the circular positioning holes 210A and 210B in the above-described exemplary embodiment, the present disclosure is not limited to this. For example, a projection may be provided on the metal-layer end portion 152, and a hole or the like to which the projection is fitted may be formed in the second attachment member 120.

In addition, although the guide pins 352 provided on the second base 350 are inserted through the guide holes 220A and 220C in the second attachment member 120 in the above-described exemplary embodiment, the present disclosure is not limited to this. For example, guide pins may be provided on the second attachment member 120, and guide holes may be formed in the second base 350.

In addition, although the sheet member 100 is formed such that the outer layer 102 is bonded to the metal layer 150 with an adhesive, the sheet member 100 is not limited to this. For example, the outer layer 102 may instead be bonded to the metal layer 150 by heating and melting the inner peripheral surface of the outer layer 102 that is in contact with the outer peripheral surface of the metal layer 150. Also, a cover layer (not illustrated) may be additionally provided on the outer peripheral surface of the outer layer 102. The cover layer is not necessarily composed of a single layer, and may instead be composed of plural layers.

Although the metal-layer end portion 152 is disposed between the fixing plate 124 and the fixed portion 122 and the fixing plate 124 and the fixed portion 122 are fastened together with the fixing screws 70 so that the metal-layer end portion 152 is fixed to the second attachment member 120 in the above-described exemplary embodiment, the metal-layer end portion 152 is not limited to this. For example, the metal-layer end portion 152 may instead be joined to the second attachment member 120 with an adhesive.

In addition, although the first attachment member 110 includes the pair of protruding portions 112 that protrude from both sides of the sheet member 100 in the axial direction and that are attached to the first base 300 in the above-described exemplary embodiment, the present disclosure is not limited to this. For example, only a protruding portion that protrudes from one end of the sheet member 100 in the circumferential direction may be attached to the first base 300. Alternatively, the central portion 113 may be formed to protrude in the circumferential direction, and the protruding portion may be attached to the first base 300.

In addition, in the above-described exemplary embodiment, the central portion 113 of the first attachment member 110 is disposed within the area of the sheet member 100 when viewed in the thickness direction of the sheet member 100 (in the radial direction). However, the central portion 113 is not limited to this. For example, the central portion 113 of the first attachment member 110 may instead be formed to protrude from one end of the sheet member 100 in the circumferential direction.

In addition, although the first attachment member 110 is joined to the metal layer 150 of the first end portion 100A of the sheet member 100 in the above-described exemplary embodiment, the first attachment member 110 is not limited to this. For example, the first attachment member 110 may instead be fixed to the first end portion 100A with screws.

In addition, the cylinder body 52 may have a substantially solid cylindrical shape instead of a substantially hollow cylindrical shape. Also, the cylinder member is not limited to the transfer cylinder 50, and may instead be, for example, a fixing cylinder that fixes toner by applying pressure, or a blanket cylinder used in offset printing. In addition, although a toner image is described as an example of an image and the toner image is formed by a dry electrophotographic system in the above-described exemplary embodiment, the toner image is not limited to this. For example, the toner image may instead be formed by a wet electrophotographic system.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A cylinder member comprising:

a cylinder body having a substantially circular cross section and including a dent portion that extends in an axial direction;

a sheet member wrapped around the cylinder body and including a metal layer that is in contact with the cylinder body and an outer layer provided on the metal layer;

a first attachment member provided on a first end portion of the sheet member and removably attached to the dent portion at a first side of the dent portion in a circumferential direction;

a second attachment member provided on an end portion of the metal layer that protrudes from the outer layer in the circumferential direction at a second end portion of the sheet member, the second attachment member being removably attached to the dent portion at a second side of the dent portion in the circumferential direction;

a tension-applying mechanism that pulls the second attachment member in a depth direction of the dent portion to apply tension to the metal layer;

a projection provided on one of the second attachment member and the end portion of the metal layer; and a fitting portion provided on other one of the second attachment member and the end portion of the metal layer and fitted to the projection.

2. The cylinder member according to claim 1, wherein the tension-applying mechanism includes:

a second base provided at the second side of the dent portion in the circumferential direction;

a guide pin that projects from one of the second base and the second attachment member in the depth direction of the dent portion and extends through a guide hole formed in other one of the second base and the second attachment member; and a fixing unit that fixes the second attachment member to the second base.

3. The cylinder member according to claim 2, wherein the fixing unit is a screw, and wherein the screw extends through a second receiving hole that is formed in the second attachment member and that is smaller than a head portion of the screw, and a leading end portion of the screw is screwed into the second base.

4. The cylinder member according to claim 3, wherein the second attachment member includes a fixing portion and a fixed portion in each of which the second receiving hole and the guide hole are formed and that are fastened together with the screw, and wherein the end portion of the metal layer is disposed between the fixing portion and the fixed portion.

5. The cylinder member according to claim 1, wherein a first base to which the first attachment member is attached is provided at the first side of the dent portion in the circumferential direction, the first attachment member being attached with a screw extending through a first receiving hole that is formed in the first attachment member and that is smaller than a head portion of the screw, and wherein a position of the first receiving hole in the first attachment member in the axial direction of the cylinder body is determined by using the projection or the fitting portion provided on the second attachment member as a reference.

6. The cylinder member according to claim 2, wherein a first base to which the first attachment member is attached is provided at the first side of the dent portion in the circumferential direction, the first attachment member being attached with a screw extending through a first receiving hole that is formed in the first attachment member and that is smaller than a head portion of the screw, and wherein a position of the first receiving hole in the first attachment member in the axial direction of the cylinder body is determined by using the projection or the fitting portion provided on the second attachment member as a reference.

7. The cylinder member according to claim 3, wherein a first base to which the first attachment member is attached is provided at the first side of the dent portion in the circumferential direction, the first attachment member being attached with a screw extending through a first receiving hole that is formed in the first attachment member and that is smaller than a head portion of the screw, and wherein a position of the first receiving hole in the first attachment member in the axial direction of the cylinder body is determined by using the projection or the fitting portion provided on the second attachment member as a reference.

8. The cylinder member according to claim 4, wherein a first base to which the first attachment member is attached is provided at the first side of the dent portion in the circumferential direction, the first attachment member being attached with a screw extending through a first receiving hole that is formed in the first attachment member and that is smaller than a head portion of the screw, and wherein a position of the first receiving hole in the first attachment member in the axial direction of the cylinder body is determined by using the projection or the fitting portion provided on the second attachment member as a reference.

9. The cylinder member according to claim 5, wherein the first attachment member includes a protruding unit including a pair of protruding portions that protrude from both sides of the sheet member in the axial direction of the cylinder body, and wherein the first receiving hole is formed in the protruding unit.

10. The cylinder member according to claim 6, wherein the first attachment member includes a protruding unit including a pair of protruding portions that protrude from both sides of the sheet member in the axial direction of the cylinder body, and wherein the first receiving hole is formed in the protruding unit.

11. The cylinder member according to claim 7, wherein the first attachment member includes a protruding unit including a pair of protruding portions that protrude from both sides of the sheet member in the axial direction of the cylinder body, and wherein the first receiving hole is formed in the protruding unit.

12. The cylinder member according to claim 8, wherein the first attachment member includes a protruding unit including a pair of protruding portions that protrude from both sides of the sheet member in the axial direction of the cylinder body, and wherein the first receiving hole is formed in the protruding unit.

13. The cylinder member according to claim 9, wherein the first attachment member includes the pair of protruding portions and a central portion disposed between the pair of protruding portions, wherein the central portion is disposed within an area of the sheet member when viewed in a thickness direction of the sheet member.

14. The cylinder member according to claim 10, wherein the first attachment member includes the pair of protruding portions and a central portion disposed between the pair of protruding portions, wherein the central portion is disposed within an area of the sheet member when viewed in a thickness direction of the sheet member.

15. The cylinder member according to claim 11, wherein the first attachment member includes the pair of protruding portions and a central portion disposed between the pair of protruding portions, wherein the central portion is disposed within an area of the sheet member when viewed in a thickness direction of the sheet member.

16. The cylinder member according to claim 12, wherein the first attachment member includes the pair of protruding portions and a central portion disposed between the pair of protruding portions, wherein the central portion is disposed within an area of the sheet member when viewed in a thickness direction of the sheet member.

17. The cylinder member according to claim 5, wherein the first base is provided with a positioning portion against which the first attachment member is abutted in the circumferential direction to position the first attachment member.

18. The cylinder member according to claim 6, wherein the first base is provided with a positioning portion against which the first attachment member is abutted in the circumferential direction to position the first attachment member.

19. The cylinder member according to claim 17, wherein the positioning portion is in contact with the first attachment member in a radial direction of the cylinder body to restrict outward movement of the first attachment member in the radial direction while the first attachment member is abutted against the positioning portion in the circumferential direction.

20. An image forming apparatus comprising:

the cylinder member according to claim 1 that transports a recording medium; and an image forming unit that forms an image on the recording medium transported by the cylinder member.

* * * * *